United States Patent [19]
Alpert et al.

[11] Patent Number: 5,418,445
[45] Date of Patent: May 23, 1995

[54] SWITCHING CIRCUIT FOR SIMULTANEOUS RAPID BATTERY CHARGE AND SYSTEM OPERATION

[75] Inventors: Martin Alpert, Cleveland; David F. Wissel, Lebanon, both of Ohio

[73] Assignee: Tele Digital Development, Inc., St. Paul, Minn.

[21] Appl. No.: 935,551

[22] Filed: Aug. 26, 1992

[51] Int. Cl.⁶ .............................................. H02J 7/00
[52] U.S. Cl. ............................................ 320/14; 307/66
[58] Field of Search ................ 320/2, 5, 6, 14, 15; 307/46, 64, 66

[56] References Cited

U.S. PATENT DOCUMENTS

| | | | |
|---|---|---|---|
| 3,573,483 | 4/1971 | White | 307/66 |
| 3,668,418 | 6/1972 | Godard | 307/66 |
| 4,065,676 | 12/1977 | Elias | 307/66 |
| 4,237,385 | 12/1980 | Jurgens et al. | 307/66 |
| 4,340,823 | 7/1982 | Miyazawa | 307/66 |
| 4,749,908 | 6/1988 | Stifter | 307/66 X |
| 4,851,756 | 7/1989 | Schaller et al. | 320/6 X |
| 4,885,521 | 12/1989 | Crampton | 320/14 |
| 5,012,121 | 4/1991 | Hammond et al. | 307/64 |
| 5,136,229 | 8/1992 | Galvin | 320/2 |

*Primary Examiner*—Kristine L. Peckman
*Attorney, Agent, or Firm*—Westman, Champlin & Kelly

[57] ABSTRACT

A switching circuit, comprising a first input for receiving power from an external power supply; a second input for receiving power for rapid charging a battery; means for selectively coupling to a power output for driving a device at least one of such power from the external power supply and power from the battery; and means for coupling such power for rapid charging a battery to the battery at the same time such power from the external power supply is coupled to the power output.

11 Claims, 2 Drawing Sheets

SWITCHING CIRCUIT FOR SIMULTANEOUS RAPID BATTERY CHARGE AND SYSTEM OPERATION

TECHNICAL FIELD

The present invention relates generally to circuits for rapidly charging a battery, and more particularly, to a switching circuit which allows rapid charging of a battery during system operation.

BACKGROUND OF THE INVENTION

Circuits for rapidly charging batteries are known. "Rapid charging" is commonly used to refer to the technique of charging a battery at a voltage and/or current which exceeds the nominal rating of the battery. As a result, rapid charging provides for the charging of a rechargeable battery in a shorter time as compared to a normal charging operation.

Unfortunately, there are several drawbacks associated with existing rapid charging circuits and the circuitry used to connect the rapid charging circuit to the battery. For example, typically it is desirable to recharge the battery while the battery remains in an electrical device being powered by the battery, such as a cordless telephone, power tool, personal pager, etc. One of the problems associated with existing rapid charging circuits is that the voltage and/or current that appears across the terminals of the battery while connected to the device is too high for the internal circuitry of the device to withstand. Such a high voltage and/or current often will result in damage to the device. As an example, a rapid charging circuit may deliver ten volts across the terminals of a five-cell nickel cadmium battery pack. This is compared to the nominal six-volts typically provided to and from the battery pack. As a result, the internal circuitry of the device can be damaged, particularly when the device is directly connected to the battery and does not include a voltage and/or current regulator.

Thus, it has been necessary in the past to remove the rechargeable battery from the electrical device and to place the battery in a stand-alone rapid charging circuit in order that the electrical device will not be subjected to high voltage and/or current during rapid charging. The removal of the battery from the electrical device is, of course, time consuming and can often result in the battery being misplaced, dropped, etc. upon removal.

Still another drawback associated with existing rapid charging circuits and the related circuitry used to connect the rapid charging circuit to the battery is that the rapid charging circuits and related circuitry do not provide for the safe operation of the device while the rapid charging is occurring. Typically, existing rapid charging circuits do not sufficiently isolate the battery from the internal circuitry of the device during rapid charging so as to permit simultaneous operation of the device using, for example, external power. Furthermore, existing rapid charging circuits and related circuitry do not provide for fast and convenient switching between power delivered to the device by an external power source and power delivered to the device from the battery.

In view of the aforementioned shortcomings of existing rapid charging circuits and the circuitry used to connect the rapid charging circuit to the battery, it is apparent that there is a strong need in the art for a switching circuit which permits the rapid charging of a rechargeable battery even while the batteries remain in a device, without damaging the internal circuitry of the device. More particularly, there is a strong need in the art for a switching circuit which permits the rapid charging of the battery simultaneously with the operation of the device, especially in the case where the device is nonregulated with respect to the power coupled to the internal circuitry. Moreover, there is a strong need for a switching circuit which sufficiently isolates the battery from the internal circuitry of the device during rapid charging to prevent damage to the device. In addition, there is a strong need in the art for a switching circuit which provides for fast switching between power delivered to the device from an external power supply and from the rechargeable battery. Furthermore, there is a strong need for a switching circuit which does not require that the battery be removed from the device prior to rapid charging.

SUMMARY OF THE INVENTION

According to one aspect of the present invention, a switching circuit is provided which includes a first input for receiving power from an external power supply, a second input for receiving power for rapid charging a battery, means for selectively coupling to a power output for driving a device at least one of the power from the external power supply and power from the battery, and means for coupling such power for rapid charging a battery to the battery at the same time such power from the external power supply is coupled to the power output.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENT

Figure 1:
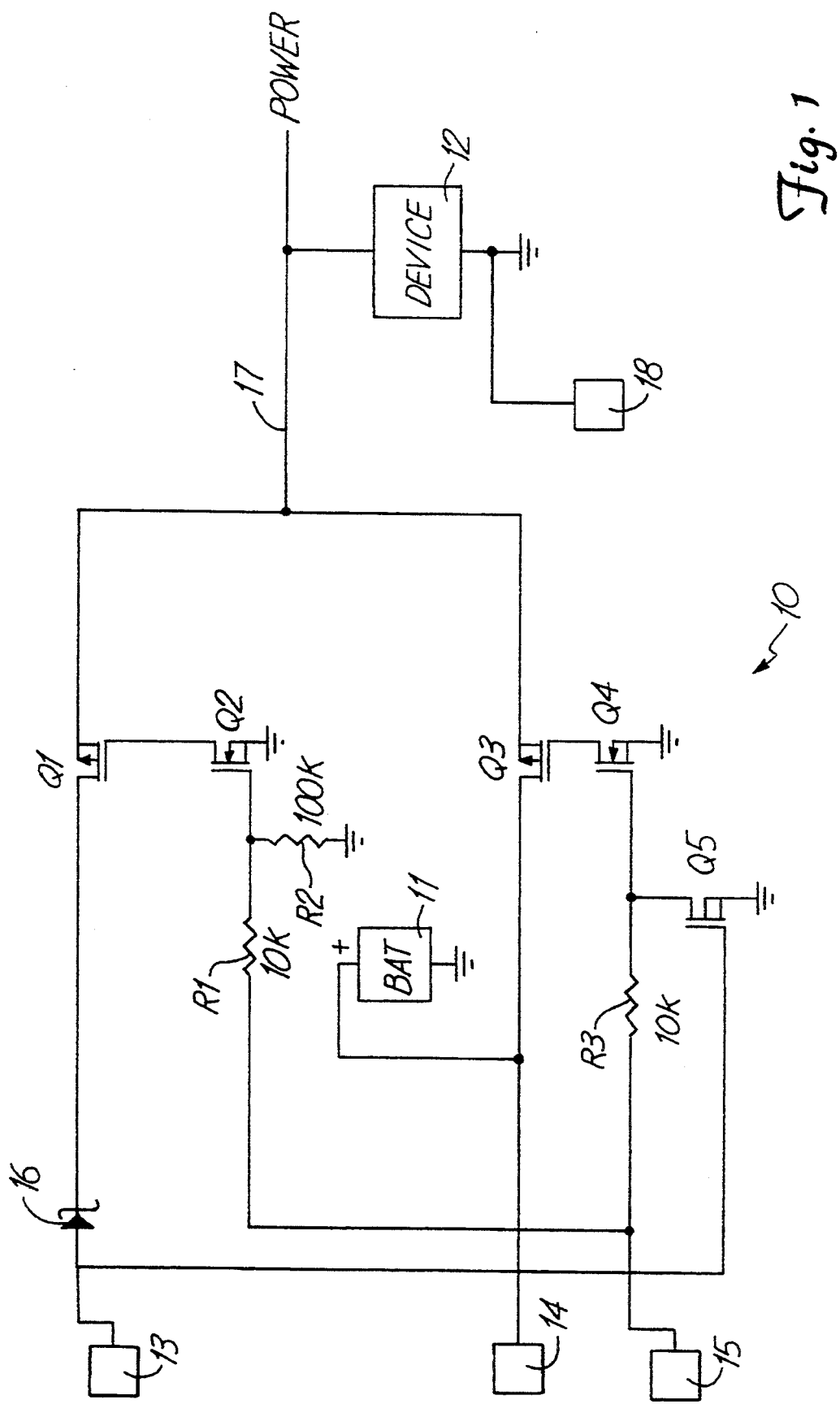
FIG. 1 is a schematic diagram of a switching circuit which enables rapid charging of a battery and simultaneous operation of an electrical device.

The present invention will now be described with reference to the drawings wherein like reference numerals are used to identify like elements throughout.

Referring initially to FIG. 1, a switching circuit 10 is shown for providing for rapid charging of a battery 11 while simultaneously providing for the operation of an electrical device 12. The battery 11 is a rechargeable battery, such as a nickel cadmium or aluminum hydride battery. The battery 11 may be a single cell or multiple cells connected in series and/or parallel, as will be appreciated. The device 12 is any electrical device intended to be powered by the battery 11 including, but not limited to, cordless telephones, cellular telephones, personal pagers, power tools, etc.

Describing the switching circuit 10 in more detail, the switching circuit 10 includes an external power input terminal 13. External power from an external power supply (not shown) is provided to the external power input terminal 13 for operating the device 12 in an external power mode. A battery recharge input terminal 14 is also included in the switching circuit 10. The output of a rapid charging battery circuit (not shown) is coupled to the battery recharge input terminal 14 for providing rapid charging power to the battery 11. Such a rapid charging battery circuit can be any known rapid charging circuit used to charge the battery 11. In addition, the switching circuit 10 includes an on/off input terminal 15 for receiving a control input which controls whether the power from the external power supply or the power from the battery 11 is delivered to the device 12. Such control input is provided from the user via a power on/off switch, for example, and/or some other type of control circuit as will be appreciated.

Power from the external power source is provided at the input terminal 13 and is coupled to the drain of a P-channel MOSFET device Q1 via a shortkey diode 16. The shortkey diode 16 is included in the preferred embodiment for reverse polarity protection as will be appreciated. The source of device Q1 is connected to a power output line 17 which serves as the power supply line to the device 12.

The battery recharge input terminal 14 is connected directly to the positive terminal of the battery 11; the other terminal of the battery is connected to ground. In addition, the battery recharge input terminal 14 is connected to the drain of a P-channel MOSFET device Q3, as is shown. The source of device Q3 is connected directly to the power output line 17.

The on/off input terminal 15 is connected via a series resistor R1 to the gate of an N-channel MOSFET device Q2. A pull-down resistor R2 is connected between the gate of the device Q2 and ground. The drain of device Q2 is coupled to the gate of Q1, and the source of Q2 is coupled to ground, as is shown. In addition, the on/off input terminal 15 is connected to the gate of an N-channel MOSFET device Q4 via a series resistor R3. The drain and source of device Q4 are connected to the gate of device Q3 and to ground, respectively. The drain of an N-channel MOSFET device Q5 is connected to the gate of device Q4 and the source of device Q5 is connected to ground. The gate of device Q5 is connected to the external power input terminal 13, as is shown. The switching circuit 10 also includes a ground terminal 18 connected to the ground in the circuit.

Describing now the operation of the switching circuit 10, the switching circuit 10 will first be described in the context of normal operation, i.e., when there is no external power provided to the input terminal 13 from an external power supply such as a wall adaptor, or the like. In addition, under normal operation there is no rapid charging power provided at the battery recharge input terminal 14. In the case where a control signal applied to the on/off input terminal 15 is "low" (e.g., approximately zero volts or some other appropriate voltage or no signal is being provided at all), the gates of devices Q2 and Q4 will be pulled low such that devices Q2 and Q4 will be off, i.e., no current will flow between each respective source and drain. As a result, the gates of devices Q1 and Q3 will remain high, and both devices Q1 and Q3 will be off. Thus, power from the battery 11 (and power from the external power input terminal 13 when external power is utilized in another operating mode) is prevented from being provided to the device 12 via the power output line 17.

When the control signal provided to the on/off input terminal 15 is high (e.g., approximately five volts or some other appropriate voltage), thereby indicating that it is desirable that power be delivered to the device 17, devices Q2 and Q4 will both be on. As a result, devices Q1 and Q3 will be on, and power from the battery 11 is provided through device Q3 to the power output line 17. If, however, external power is applied at the external power input terminal 13 in an external power operating mode, device Q5 will be turned on, and devices Q4 and Q3 will be turned off such that only power from the external power source is delivered to the power output line 17 through device Q1.

In the event that external power is provided to the external power input terminal 13 and a high-voltage and/or high-current rapid charging power is provided to the rapid charging battery input terminal 14, the operation of the switching circuit 10 is as follows. When the control signal provided to the on/off input terminal 15 is low, devices Q1–Q4 will all be off in the same manner as is described above, and power is not delivered to the device 12. If the control signal is "high", devices Q1 and Q2 will be on, thus causing the power from the external power supply to be delivered to the device 12 through device Q1. At the same time, device Q5 will be on and, therefore, devices Q3 and Q4 will be off, thereby isolating the battery 11 from the device 12. As a result, the high voltage and/or current rapid charging power delivered to the battery recharge input terminal 14 will be delivered to the battery 11 without exposing the internal circuitry of the device 12 to such high voltage, for example. Thus, the device 12 can still be operated using the external power delivered to the external power input terminal 13 at the same time that the battery 11 undergoes rapid charging via the rapid charging power provided at battery recharge input terminal 14. If the control signal to the on/off input terminal 15 is low, the battery 11 remains directly connected to the battery recharge input terminal 14 and continues to undergo rapid charging even while power is not applied to the device 12.

It will be appreciated that a nominal recharge voltage, e.g., the same voltage as the battery 11, can be applied to battery recharge input terminal 14 in an alternative operating mode. As a result, the power provided at the battery recharge input terminal 14 can be used not only to recharge the battery 11, but also can be used to power the device 12 (through device Q3) at the same time.

Thus, it will be apparent that the switching circuit 10 of the present invention provides for the rapid charging or normal charging of the battery 11 even while the device 12 is operated simultaneously. Specifically, the switching circuit 10 electrically isolates the battery 11 from the power output line 17 during rapid charging using devices Q3–Q5; and during that period of rapid charging, the device 12 can be operated, if desired, by external power from the external power input 13 via the diode 16 and device Q1. In addition, the switching circuit 10 provides for fast switching of the power delivered to the device 12 between the external power provided at external power input terminal 13 and the battery power provided by the battery 11. Such fast switching is accomplished using device Q5 which isolates the battery 11 from the power output line 17 when power is provided by the external power source.

In view of the above, it will be appreciated that it is not necessary that the battery 11 and/or the device 12 be disconnected from the switching circuit 10 in order to perform rapid charging of the battery 11 without the risk of damage to the device 12.

Figure 2:
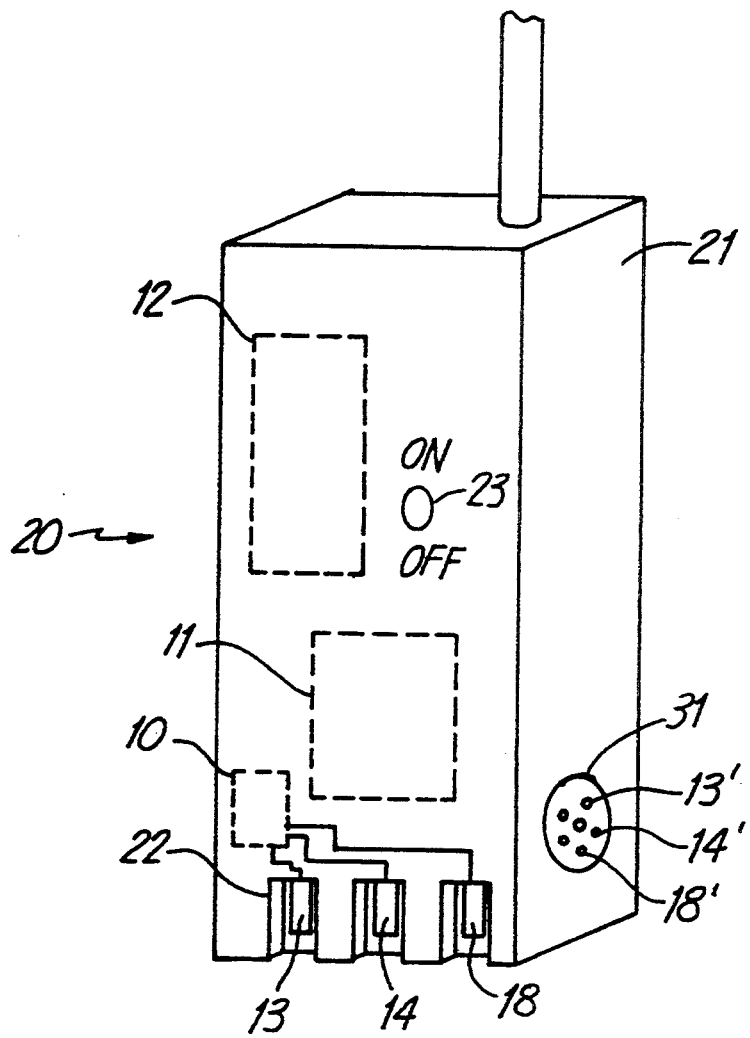
FIG. 2 is a diagrammatic view of an electrical device including the switching circuit of FIG. 1.

Referring now to FIG. 2, a cellular telephone 20 is shown which includes the switching circuit 10 of the present invention. The cellular telephone 20 includes a housing 21 in which is located the switching circuit 10, the battery 11, and the device 12. Note that the device 12 in this particular example takes the form of the cellular telephone's internal circuitry. The housing 21 includes a plurality of recesses 22. Located in the respective recesses 22 are the input terminals 13, 14 and 18 which are exposed in order that they can be electrically connected to an external power supply, a battery recharge supply, and a corresponding ground, respectively. Such terminals may be conventional and, therefore, further detail has been omitted. An on/off switch 23 may be coupled in conventional fashion to provide selectively to the on/off input terminal 15 the appropriate relatively high or low or other control signal. The switch 23 may be operated manually or by some automatic means, as may be desired.

Figure 3:
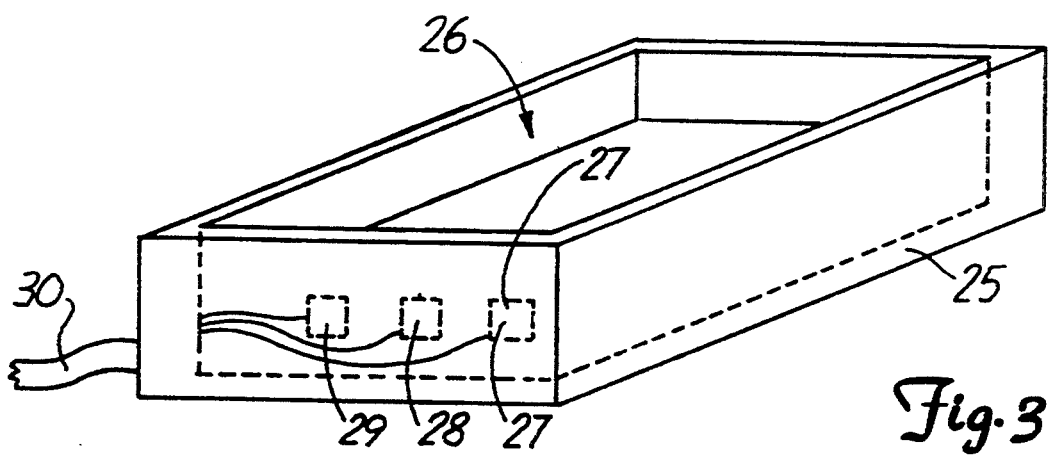
FIG. 3 is a diagrammatic view of a cradle in which the device of FIG. 2 may be placed to undergo rapid charging.

FIG. 3 shows an exemplary cradle 25 into which the cellular telephone 20 can be placed for rapid charging. The cellular telephone 20 is inserted into a cavity 26 in the cradle 25 such that the external power, battery recharge power, and corresponding ground which are provided at respective terminals 27, 28, 29 in the cradle are electrically coupled to the corresponding input terminals 13, 14 and 18 on the cellular telephone. Power and ground are provided to the terminals 27, 28, 29 via a multi-conductor cable 30 from an appropriate power supply(ies) (not shown).

Referring again to FIG. 2, the cellular telephone 20 can include a multi-conductor port 31 in addition to, or in place of, the terminals 13, 14 and 18 located within the recesses 22. More particularly, the multi-conductor port 31 includes pins 13', 14' and 18' which are electrically and functionally equivalent to the respective input terminals 13, 14 and 18 in the recesses 22. As a result, external power, rapid charging power, and a corresponding ground can be provided to the cellular telephone 20 via a multi-conductor cable (not shown) plugged into the connector 31. Using such a multi-conductor port 31 with a corresponding cable provides for the convenient use of the cellular telephone 20 simultaneously with the rapid charging of the battery 11.

As one example of use of the switching circuit 10 to control delivery of operating power to the circuitry 12 of a cellular telephone 20, initially consider the telephone 20 being in the cradle 25. With external power supplied via cable 30 and terminal 27 to the external power input terminal 13, the telephone 20 may be operated in usual fashion using such power. If relatively high voltage (or current or some other appropriate electrical input) then also is being supplied via the cable 30, terminal 28 and battery recharge input terminal 14, the battery 11 will be recharged. The aforesaid operation will occur regardless of whether the on/off switch 23 is on or off due to the action of device Q5. However, when the telephone is out of the cradle 25 for use portably, and no inputs are provided the terminals 13, 14, 18, power to the telephone circuitry 23 is supplied selectively from the battery 11 under control of the on/off switch 23 operating through the devices Q3 and Q4.

Although the invention has been shown and described with respect to certain preferred embodiments, it is obvious that equivalents and modifications will occur to others skilled in the art upon the reading and understanding of the specification. For example, while the switching circuit 10 is described in the preferred embodiment as being formed by an array of P-channel and N-channel MOSFETs, it will be appreciated that various other types of switching elements and/or arrays can be used without departing from the scope of the invention. The present invention includes all such equivalents and modifications, and is limited only by the scope of the following claims.

What is claimed is:

1. A switching circuit for providing power to control circuitry, the switching circuit comprising:

a battery providing an output at a nominal output level;

a charging input terminal, coupled to the battery, for receiving a charge signal, comprising one of a rapid charge signal and a nominal charge signal, and providing the charge signal to the battery, the rapid charge signal having a signal level exceeding the nominal output level of the battery and the nominal charge signal having a signal level substantially the same as the nominal output level of the battery;

an external power input terminal, coupled to the control circuitry, for receiving an external power signal from an external source and providing the external power signal to the control circuitry at an external source level to power the control circuitry;

an on/off input terminal for receiving an on/off signal;

switching means, coupled to the charging input terminal, the on/off input terminal, and the external power input terminal and responsive to the external power signal and the on/off signal, for coupling the external power input terminal and the charging input terminal to the control circuitry based on the external power signal and the on/off signal, the switching means electrically isolating the battery from the control circuitry when the external power signal is received so the rapid charge signal is not provided to the control circuitry, and the switching means including means for providing the nominal charge signal to the control circuitry and to the battery to simultaneously power the control circuitry and charge the battery, in the absence of the external power signal.

2. The switching circuit of claim 1 wherein the switching means comprises:

first switch means, coupled to the external power input terminal and the on/off input terminal, for connecting the external power input terminal to the control circuitry in response to the on/off signal being in an on state and for disconnecting the external power input terminal from the control circuitry in response to the on/off signal being in an off state; and second switch means, coupled to the on/off input terminal, the external power input terminal, and the battery, for disconnecting the battery from the control circuitry in response to the external power signal and for disconnecting the control circuitry from the battery in response to the on/off signal being in the off state.

3. The switching circuit of claim 2 wherein the first and second switch means each comprise:
a plurality of metal-oxide-semiconductor devices.

4. A cellular telephone system including a cellular telephone, the cellular telephone system comprising:
control circuitry for controlling operation of the cellular telephone;
a battery, coupled to the control circuitry, for providing a power signal, at a nominal output level, to the control circuitry;
an external power input terminal, coupled to the control circuitry, for receiving an external power signal from an external source and providing the external power signal to the control circuitry, at a nominal output level, to power the control circuitry;
an on/off input terminal for receiving an on/off signal;
a charging input terminal, coupled to the battery, for receiving a rapid charge signal from an external charger and providing the rapid charge signal to the battery to charge the battery, the rapid charge signal having a signal level that exceeds the nominal output level of the battery and that exceeds the nominal output level of the external source; and
switching means, coupled to the charging input terminal, the on/off input terminal, and the external power input terminal and responsive to the external power signal and the on/off signal, for coupling the external power input terminal and the charging input terminal to the control circuitry based on the external power signal and the on/off signal, the switching means electrically isolating the battery from the control circuitry when the external power signal is received so the rapid charge signal is not provided to the control circuitry.

5. The cellular telephone system of claim 4 wherein the charging input terminal is suitable for receiving a nominal charge signal having a nominal level substantially the same as the nominal output level of the battery, and wherein the switching means includes:
means for providing the nominal charge signal to the control circuitry and to the battery to simultaneously power the control circuitry and charge the battery, in the absence of the external power signal.

6. The cellular telephone system of claim 4 wherein the on/off signal has an on state and an off state, and wherein the switching means comprises:
first switch means, coupled to the external power input terminal and the on/off input terminal, for connecting the external power input terminal to the control circuitry in response to the on/off signal being in the on state and for disconnecting the external power input terminal from the control circuitry in response to the on/off signal being in the off state; and
second switch means, coupled to the on/off input terminal, the external power input terminal, and the battery, for disconnecting the battery from the control circuitry in response to the external power signal and for disconnecting the control circuitry from the battery in response to the on/off signal being in the off state.

7. The cellular telephone system of claim 6 wherein the first and second switch means each comprise:
a plurality of metal-oxide-semiconductor devices.

8. The cellular telephone system of claim 4 and further comprising:
a cellular telephone housing enclosing the control circuitry, the battery and the switching means, the external power input terminal and the charging input terminal being electrical contacts recessed in the cellular telephone housing.

9. The cellular telephone system of claim 8 and further comprising:
a multi-port connector supporting the electrical contacts recessed in the cellular telephone housing.

10. The cellular telephone system of claim 8 and further comprising:
a multi-conductor cable having electrical contacts matable with the electrical contacts recessed in the cellular telephone housing.

11. A method of operating a switching circuit in a cellular telephone, the switching circuit having a battery that provides a battery power signal, and the cellular telephone being operated by control circuitry, the method comprising:
connecting the battery to the control circuitry to power the control circuitry;
providing an external power signal;
disconnecting the control circuitry from the battery in response to the external power signal;
providing the external power signal to the control circuitry;
providing an on/off signal in one of a first and second logical states;
disconnecting the control circuitry from both the battery and the external power signal in response to the on/off signal being in the other of the first and second logical states;
connecting the control circuitry to one of the battery and the external power signal in response to the on/off signal being in the other of the first and second logical states;
providing a rapid charge signal to the battery, the rapid charge signal having a signal level that exceeds the battery power signal and the external power signal; and
wherein the step of providing the rapid charge signal is performed only after the step of disconnecting the control circuitry from the battery.

* * * * *

UNITED STATES PATENT AND TRADEMARK OFFICE
CERTIFICATE OF CORRECTION

PATENT NO. : 5,418,445

DATED : May 23, 1995

INVENTOR(S) : Alpert et al.

It is certified that error appears in the above-indentified patent and that said Letters Patent is hereby corrected as shown below:

Column 8, line 45 delete "the other of" and insert --one of--.

Signed and Sealed this

Third Day of October, 1995

Attest:

BRUCE LEHMAN

Attesting Officer

Commissioner of Patents and Trademarks